United States Patent
Zankl et al.

[11] Patent Number: 6,092,860
[45] Date of Patent: Jul. 25, 2000

[54] WIND GUARD FOR A CONVERTIBLE

[75] Inventors: Helmut Zankl; Gottfried Nuetzl, both of Buchbach; Frank Ullrich, Haimhausen; Johannes Ametsbichler, Grafing, all of Germany

[73] Assignee: Bayerische Motoren Werke AG, Germany

[21] Appl. No.: 09/110,460

[22] Filed: Jul. 7, 1998

[30] Foreign Application Priority Data

Jul. 22, 1997 [DE] Germany ............................ 197 31 326

[51] Int. Cl.[7] ........................................................ B60J 7/22
[52] U.S. Cl. ........................................................ 296/180.1
[58] Field of Search ........................ 296/85, 136, 180.1, 296/24.1; 280/756

[56] References Cited

U.S. PATENT DOCUMENTS

| | | | |
|---|---|---|---|
| 4,761,030 | 8/1988 | Boykin | 296/136 X |
| 4,850,637 | 7/1989 | Carlino | 296/180.1 |
| 5,707,099 | 1/1998 | Schrader et al. | 296/180.1 |
| 5,746,472 | 5/1998 | Rogers | 296/180.1 |

FOREIGN PATENT DOCUMENTS

| | | |
|---|---|---|
| 4110204A1 | 12/1991 | Germany . |
| 19534584C1 | 9/1996 | Germany . |
| 19529882A1 | 2/1997 | Germany . |
| 2305644 | 4/1997 | United Kingdom . |
| 195365552A1 | 4/1997 | Germany . |

*Primary Examiner*—D. Glenn Dayoan
*Assistant Examiner*—Chad D Wells
*Attorney, Agent, or Firm*—Evenson, McKeown, Edwards & Lenahan, P.L.L.C.

[57] ABSTRACT

A wind guard can be applied from above over two rollover bars. The wind guard has two lateral pockets whose shapes are adapted to the contour of the rollover bars. A center part extends between the pockets which can be connected with the adjacent pockets by way of zippers. The wind guard has a simple construction, can be stored easily and, in a simple manner, allows the rolling-down of the center part, whereby the view toward the rear is improved in this area and the access to possibly existing depositing boxes or the like is also improved.

19 Claims, 3 Drawing Sheets

WIND GUARD FOR A CONVERTIBLE

BACKGROUND OF THE INVENTION

This application claims the priority of German application 197 31 326.4, filed Jul. 22, 1997 in Germany, the disclosure of which is expressly incorporated by reference herein.

1. Field of the Invention

The invention relates to a wind guard for a convertible which is applied from above over two rollover bars, each rollover being provided behind a vehicle seat and being fixed on the vehicle body.

2. Description of the Related Art

A known wind guard for the SLK convertible by Daimler Chrysler is constructed as a pocket which extends along almost the whole vehicle width, is open in the downward direction, is turned over the two stationary rollover bars and is held by way of fastening straps on its lower edge on the vehicle body. This wind guard still has several disadvantages. If it remains on the rollover bars, for example, also when the folding top is closed, the view toward the rear will even be impaired if the wind guard as a whole consists of a net-type material. The wind guard, which extends over the whole vehicle width, would also impair the manual closing of a folding top from the front seats. Furthermore, under certain circumstances, the access to depositing boxes or the like in the area between the rollover bars may also be impaired.

It is also known (German Patent Document DE 195 34 584 C1) to insert a wind guard into the openings of two rollover bar sections situated side-by-side, said wind guard being in the form of plastic lattices or perforated sheets or of a flexible net and to insert into the space remaining between the bars a pane of plastic, such as Plexiglas or glass, and to lock it. The whole wind guard requires relatively high expenditures, is cumbersome with respect to its handling and requires care with respect to handling the pane.

Finally, it is known (German Patent Document DE 41 10 204 A1) to turn an approximately parallelepiped hood over the headrests or an upper portion of the backrests of the front seats of a convertible. In this case, the center area between the headrests is provided with a transparent foil. This wind guard also impairs, for example, the handling of a folding top from the front seats and hinders the access to depositing boxes situated behind the front seats.

SUMMARY OF THE INVENTION

It is an object of the invention to provide a wind guard of the above-mentioned type which has a simple construction, is easy to handle and, in its center area, can be easily removed and stored.

According to the invention, this object can be achieved by providing a wind guard of the above-mentioned general type, wherein the wind guard has two pockets whose shape is adapted to the contour of the rollover bars, a center part of the wind guard extending between the pockets. Preferably, the center part is connected on its lateral edges by means of a zipper or sliding fastener with the one pocket respectively.

As the result of the two pockets adapted to the contour of the stationary rollover bars, the wind guard can be fastened in a very secure and positionally stable manner. The tendency to flutter is at least considerably reduced.

Because the center part is connected on its lateral edges by a zipper or sliding fastener with one of the adjacent pockets respectively according to certain preferred embodiments, the center part can easily be lowered and rolled off to such an extent that the view toward the rear is completely unaffected in this center area. In addition, there is an easy access to depositing boxes in the area of the vehicle body between the rollover bars.

Other objects, advantages and novel features of the present invention will become apparent from the following detailed description of the invention when considered in conjunction with the accompanying drawings.

DETAILED DESCRIPTION OF THE DRAWINGS

Figure 1:
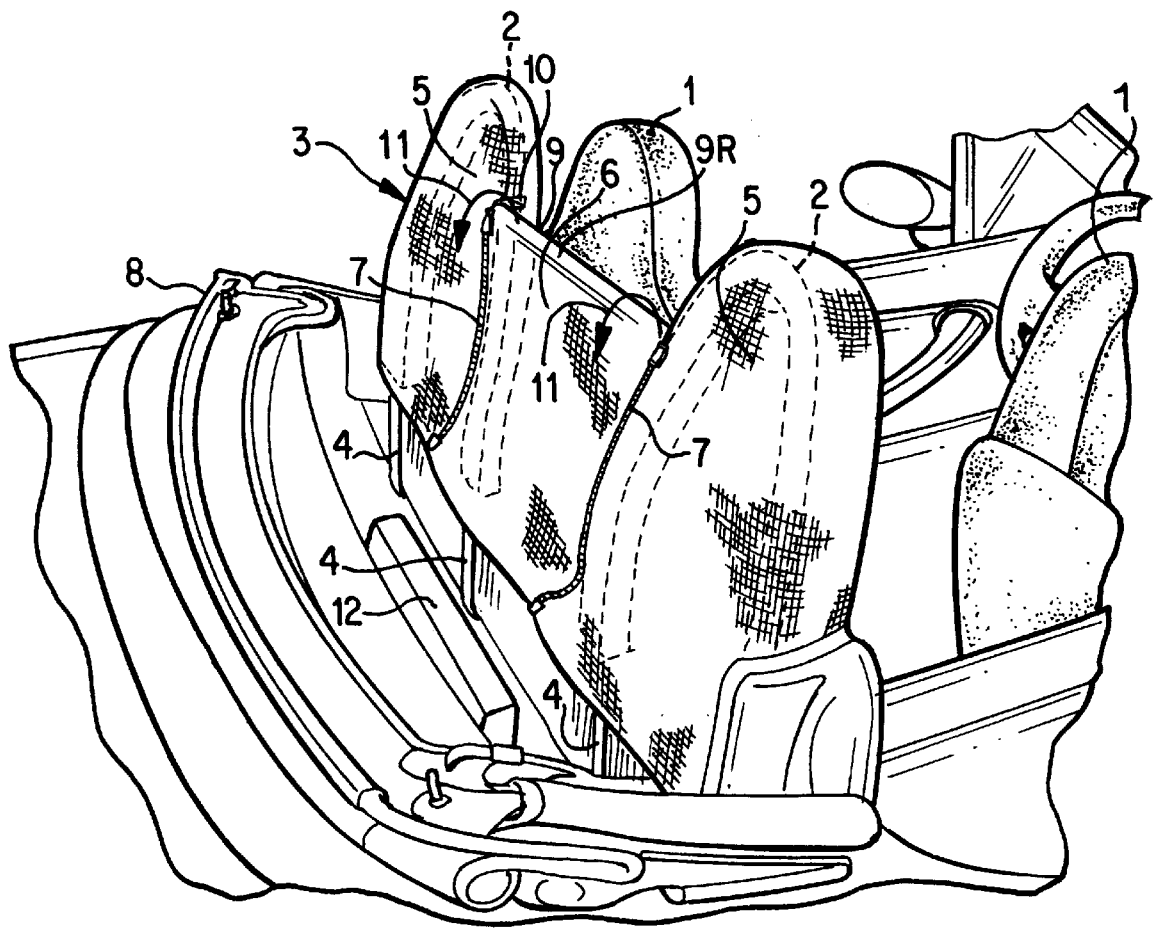
FIG. 1 is a perspective view laterally from the rear of a convertible constructed as a roadster and equipped with a preferred embodiment of the present invention.
Figure 2:
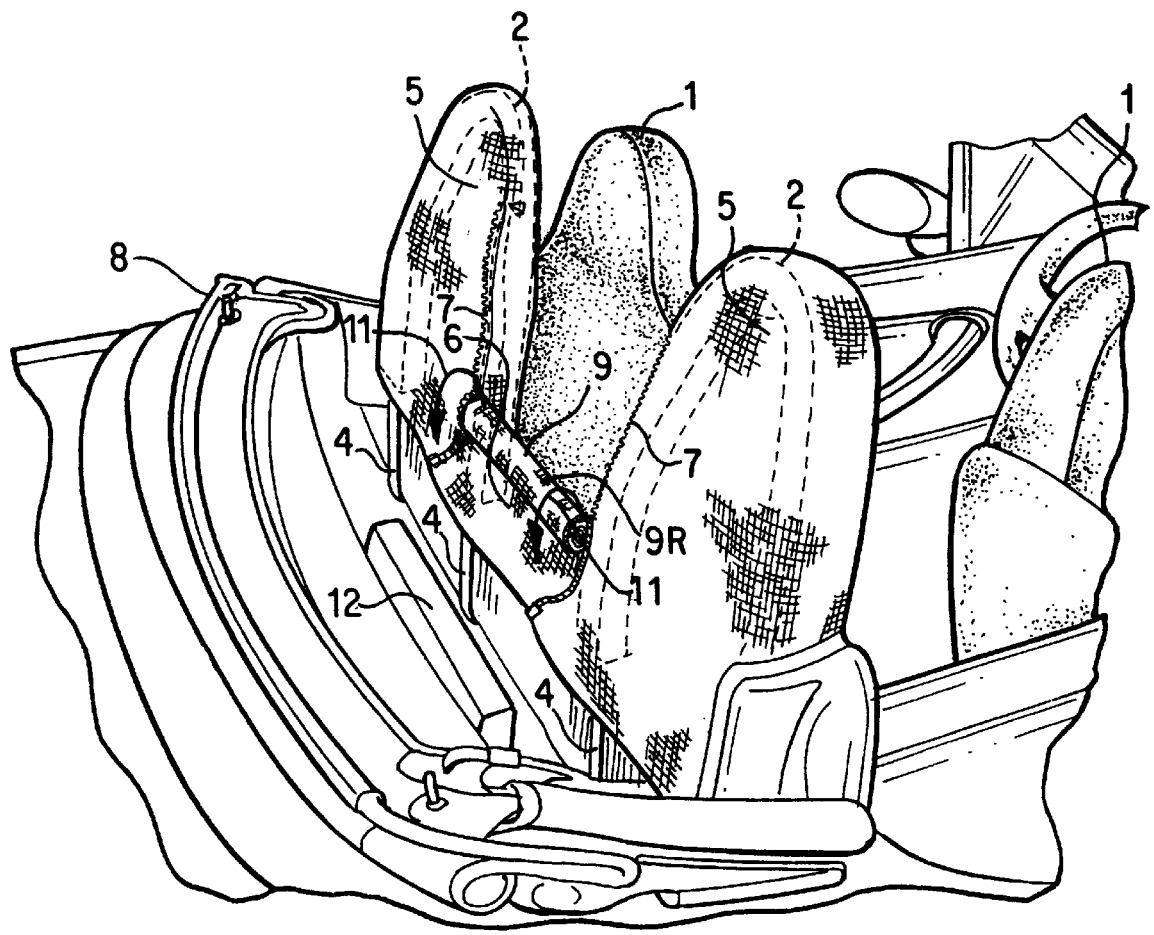
FIG. 2 is a perspective view laterally from the rear of a convertible constructed as a roadster and equipped with a preferred embodiment of the present invention having a center part of the preferred embodiment in a lowered position.
Figure 3:
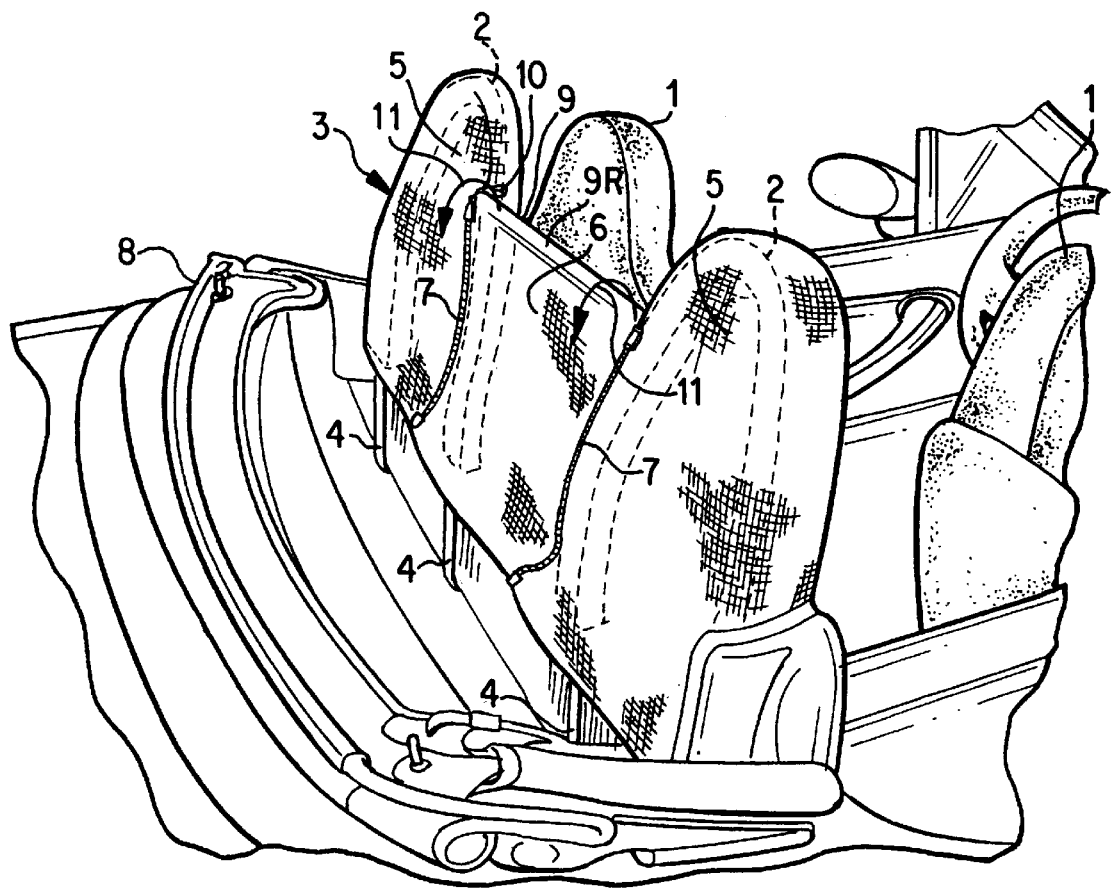
FIG. 3 is a perspective view laterally from the rear of a convertible constructed as a roadster not including a stowage depositing box and equipped with a preferred embodiment of the present invention.

The roadster illustrated in the drawing has two stationary rollover bars 2 which are arranged behind the seats 1 and are indicated by dash-dotted lines. A wind guard is turned or slid from above over-the two rollover bars 2 and is fastened to the vehicle body by means of tightening straps 4 which are only outlined. The two rollover bars 2 may also be upwardly projecting sections of a rollover bar which, as a whole, has a one-piece design (compare, for example, German Patent Document DE 195 34 584 C1).

The wind guard 3 comprises two pockets 5 whose shape is adapted to the contour of the rollover bars 2, a center part 6 extending between the pockets. On its lateral edges, the center part 6 is in each case connected by means of a zipper 7 with the adjoining pocket 5. The two halves of each zipper 7 are fixedly connected with one another on the bottom.

After the opening of the zippers 7, the center part 6 can be lowered and will no longer impair the view toward the rear. In addition, the deposited folding top 8 can easily be gripped with one hand from one of the seats 1. It can easily be closed and opened in this manner. The (not shown) grip of the slide of the zipper 7 points toward the front in the driving direction so that the zipper can also easily be operated from the seats.

On its upper edge 9, the center part 6 of the wind guard 3 is provided with a stiffening rod 9R which can be pushed into an edge border of the center part 6. The upper corner areas of the center part 6 and the stiffening rod 9R are expediently connected by way of an additional fastening element 10 with the adjoining pocket 5. After the release of this fastening element 10, such as a snap fastener or a VELCRO® fastener, and after the opening of the zippers 7, as indicated by the arrows 11, the center part 6 can be rolled downward and be stored in the area existing between the deposited folding top and the seats, such as a stowage depositing box 12. In addition, the center part is configured to be rolled down to provide access to the depositing box 12. For a secure fixing, tightening straps may also be provided here. After the removal of the whole wind guard 3 from the rollover bars 2, it is also possible to fold the lateral pockets 5 toward the inside and roll them up together with the center part 6 and to store them on the vehicle in the same manner.

A net-type fabric or a so-called perforated foil is suitable as the material for the whole wind guard and keeps away a large portion of the air flow directed from the rear area of the vehicle toward the front but lets a small portion pass through in a desirable manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Wind guard for a convertible which is applied from above over two rollover bars provided behind respective vehicle seats and being fixed on the vehicle body, wherein the wind guard has two pockets each having an inwardly facing edge and a center part extending between the edges of the pockets and wherein the center part and the edges of the pocket are connected by means of a zipper or a sliding fastener.

2. Wind guard according to claim 1, wherein the zipper or sliding fastener runs approximately vertical and two halves of the zipper or sliding fastener are connected together at their lower ends.

3. Wind guard according to claim 1, wherein each zipper or sliding fastener is provided with a grip, and the grip is arranged in front in a vehicle driving direction.

4. Wind guard according to claim 1, wherein the center part is provided with a stiffening rod at least on its upper edge.

5. Wind guard according to claim 4, wherein upper corner areas of the center part are connectible by way of an additional fastening element with the adjoining pocket.

6. Wind guard according to claim 1, wherein the center part is configured to be rolled together in a downward direction.

7. Wind guard assembly for use in a convertible which has a pair of laterally adjacent vehicle seats and respective rollover bars provided behind each vehicle seat with a center space defined by laterally facing sides of the rollover bars, said wind guard assembly comprising:

a wind guard having two pockets each having an inwardly facing edge and a wind guard center part extending between the edges of the pockets and wherein the center part and the edges of the pocket are connected by means of a zipper or a sliding fastener.

8. Wind guard assembly according to claim 7, wherein the zipper or sliding fastener runs approximately vertical and two halves or the zipper of sliding fastener are connected together at their lower ends.

9. Wind guard assembly according to claim 7, wherein each zipper or sliding fastener is provided with a grip, and the grip is arranged in front in a vehicle driving direction.

10. Wind guard assembly according to claim 7, wherein the center part is provided with a stiffening rod at least on its upper edge.

11. Wind guard assembly according to claim 10, wherein upper corner areas of the center part are connectible by way of an additional fastening element with the adjoining pocket.

12. Wind guard assembly according to claim 8, wherein the center part is configured to be rolled together in a downward direction.

13. A convertible automobile comprising:

a pair of laterally adjacent vehicle seats and respective rollover bars provided behind each vehicle seat with a center space defined by laterally facing sides of the rollover bars, and a wind guard having two pockets each having an inwardly facing edge and a wind guard center part extending between the edges of the pockets and wherein the center part and the edges of the pocket are connected by means of a zipper or a sliding fastener.

14. A convertible automobile according to claim 13, wherein the zipper or sliding fastener runs approximately vertical and two halves of the zipper or sliding fastener are connected together at their lower ends.

15. A convertible automobile according to claim 13 wherein each zipper or sliding fastener is provided with a grip, and the grip is arranged in front in a vehicle driving direction.

16. A convertible automobile according to claim 13, wherein the center part is provided with a stiffening rod at least on its upper edge.

17. A convertible automobile according to claim 16, wherein upper corner areas of the center part are connectible by way of an additional fastening element with the adjoining pocket.

18. A convertible automobile according to claim 13, wherein the center part is configured to be rolled together in a downward direction.

19. A convertible automobile according to claim 13, further comprising at one least stowage depositing box in an area between the rollover bars, and wherein said center part is configured to be rolled downward to provide access to the at least one depositing box.

* * * * *